(12) United States Patent
Kanamarlapudi et al.

(10) Patent No.: US 9,247,561 B2
(45) Date of Patent: Jan. 26, 2016

(54) APPARATUS AND METHOD FOR PRIORITIZING NON-SCHEDULED DATA IN A WIRELESS COMMUNICATIONS NETWORK

(71) Applicant: QUALCOMM Incorporated, San Diego, CA (US)

(72) Inventors: Sitaramanjaneyulu Kanamarlapudi, San Diego, CA (US); Liangchi Hsu, San Diego, CA (US); Yongsheng Shi, San Diego, CA (US); Yi Zhang, San Diego, CA (US); Omesh Kumar Handa, Carlsbad, CA (US); Mallikarjuna Rao Gorumuchu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 14/025,538

(22) Filed: Sep. 12, 2013

(65) Prior Publication Data

US 2014/0078985 A1     Mar. 20, 2014

Related U.S. Application Data

(60) Provisional application No. 61/703,684, filed on Sep. 20, 2012, provisional application No. 61/707,416, filed on Sep. 28, 2012.

(51) Int. Cl.
*G01R 31/08* (2006.01)
*H04W 72/12* (2009.01)
*H04W 52/02* (2009.01)

(52) U.S. Cl.
CPC ...... *H04W 72/1242* (2013.01); *H04W 52/0216* (2013.01)

(58) Field of Classification Search
CPC .................. H04W 72/1242; H04W 52/0216
See application file for complete search history.

(56) References Cited

U.S. PATENT DOCUMENTS

2006/0268821 A1*  11/2006  Terry ............................ 370/349
2006/0274690 A1*  12/2006  Chun et al. .................... 370/329
2007/0047451 A1*   3/2007  Lohr et al. .................... 370/242

(Continued)

FOREIGN PATENT DOCUMENTS

WO    WO 2013/037109 A1    3/2013

OTHER PUBLICATIONS

Sanders, M. et al. 3GPP TSG-RAN WG@ Meeting #68bis Change Request, Jan. 18-22, 2010.

*Primary Examiner* — Robert Wilson
(74) *Attorney, Agent, or Firm* — Arent Fox LLP

(57) ABSTRACT

Techniques for prioritizing non-scheduled data are described. Non-scheduled data to be transmitted on a non-scheduled MAC-d flow having a non-scheduled priority and scheduled data to be transmitted on a scheduled MAC-d flow having a scheduled priority may be identified by a user equipment (UE). The UE may transmit the non-scheduled MAC-d flow and the scheduled MAC-d flow according to a priority condition. In one aspect, the UE may receive a pre-allocation of power associated with a non-empty non-scheduled MAC-d flow. Based on a priority condition that the non-scheduled priority is a highest priority, the UE may apply all of the pre-allocation of power when transmitting the non-scheduled MAC-d flow. In one aspect, based on a priority condition that the non-scheduled priority is a lower priority, the UE may adjust the non-scheduled priority and/or the scheduled priority so that the non-scheduled priority is a higher priority.

16 Claims, 10 Drawing Sheets

(56) References Cited

U.S. PATENT DOCUMENTS

| | | | |
|---|---|---|---|
| 2008/0273463 A1* | 11/2008 | Whitehead et al. | 370/235 |
| 2009/0244171 A1* | 10/2009 | King et al. | 347/32 |
| 2010/0202394 A1* | 8/2010 | Zhang et al. | 370/329 |
| 2013/0094483 A1* | 4/2013 | Marinier et al. | 370/336 |
| 2014/0078985 A1* | 3/2014 | Kanamarlapudi et al. | 370/329 |

* cited by examiner

APPARATUS AND METHOD FOR PRIORITIZING NON-SCHEDULED DATA IN A WIRELESS COMMUNICATIONS NETWORK

CLAIM OF PRIORITY UNDER 35 U.S.C. §119

The present Application for Patent claims priority to Provisional Application No. 61/703,684 entitled "SCHEME TO PRIORITIZE PRE-ALLOCATED POWER TO NON-SCHEDULED DATA" filed Sep. 20, 2012, and Provisional Application No. 61/707,416 entitled "APPARATUS AND METHOD FOR PRIORITIZING PRE-ALLOCATED POWER TO NON-SCHEDULED DATA IN A WIRELESS COMMUNICATIONS NETWORK" filed Sep. 28, 2012, both of which are assigned to the assignee hereof and hereby expressly incorporated by reference herein.

BACKGROUND

1. Field

Aspects of the present disclosure relate generally to wireless communication systems, and more particularly, to prioritizing non-scheduled data in a wireless communications network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

As an example, in Release 9 of the 3rd Generation Partnership Project (3GPP) family of specifications (or standards), "pre-allocation" of power to non-scheduled (NS) data on a primary cell (or carrier or frequency) was introduced for Dual Cell-High Speed Uplink Packet Access (DC-HSUPA). More particularly, according to the 3GPP Medium Access Control (MAC) technical specification (TS) 25.321, entitled "Universal Mobile Telecommunications System (UMTS); Medium Access Control (MAC) protocol specification", which is publicly available, for DC-HSUPA when there is more than one Activated Uplink Frequency available, a certain amount of power is pre-allocated for non-empty non-scheduled MAC-d flows. However, the description of the pre-allocation scheme is ambiguous and different interpretations result in different behavior at a user equipment (UE). Because of this ambiguity, it is possible that non-scheduled, but high priority data, such as, for example, signaling radio bearer (SRB) data, may not be transmitted by a UE in a timely fashion resulting in undesirable call drops.

As such, improvements in prioritizing non-scheduled data in a wireless communications network are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of prioritizing non-scheduled data is described. The method may include identifying non-scheduled data to be transmitted on a non-scheduled MAC-d flow. The non-scheduled MAC-d flow may be associated with a non-scheduled priority. The method may include identifying scheduled data to be transmitted on a scheduled MAC-d flow. The scheduled MAC-d flow may be associated with a scheduled priority. The method may include transmitting the non-scheduled MAC-d flow and the scheduled MAC-d flow according to a priority condition.

In an aspect, a computer program product for prioritizing non-scheduled data is described. The computer program product may include a computer-readable medium including code. The code may cause a computer to identify non-scheduled data to be transmitted on a non-scheduled MAC-d flow. The non-scheduled MAC-d flow may be associated with a non-scheduled priority. The code may cause a computer to identify scheduled data to be transmitted on a scheduled MAC-d flow. The scheduled MAC-d flow may be associated with a scheduled priority. The code may cause a computer to transmit the non-scheduled MAC-d flow and the scheduled MAC-d flow according to a priority condition.

In an aspect, an apparatus for prioritizing non-scheduled data is described. The apparatus may include means for identifying non-scheduled data to be transmitted on a non-scheduled MAC-d flow. The non-scheduled MAC-d flow may be associated with a non-scheduled priority. The apparatus may include means for identifying scheduled data to be transmitted on a scheduled MAC-d flow. The scheduled MAC-d flow may be associated with a scheduled priority. The apparatus may include means for transmitting the non-scheduled MAC-d flow and the scheduled MAC-d flow according to a priority condition.

In an aspect, an apparatus for prioritizing non-scheduled data is described. The apparatus may include an identifying component configured to identify non-scheduled data to be transmitted on a non-scheduled MAC-d flow and identify scheduled data to be transmitted on a scheduled MAC-d flow. The non-scheduled MAC-d flow may be associated with a non-scheduled priority and the scheduled MAC-d flow may be associated with a scheduled priority. The apparatus may include a MAC-d flow transmitter configured to transmit the non-scheduled MAC-d flow and the scheduled MAC-d flow according to a priority condition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the

DETAILED DESCRIPTION

Figure 1:
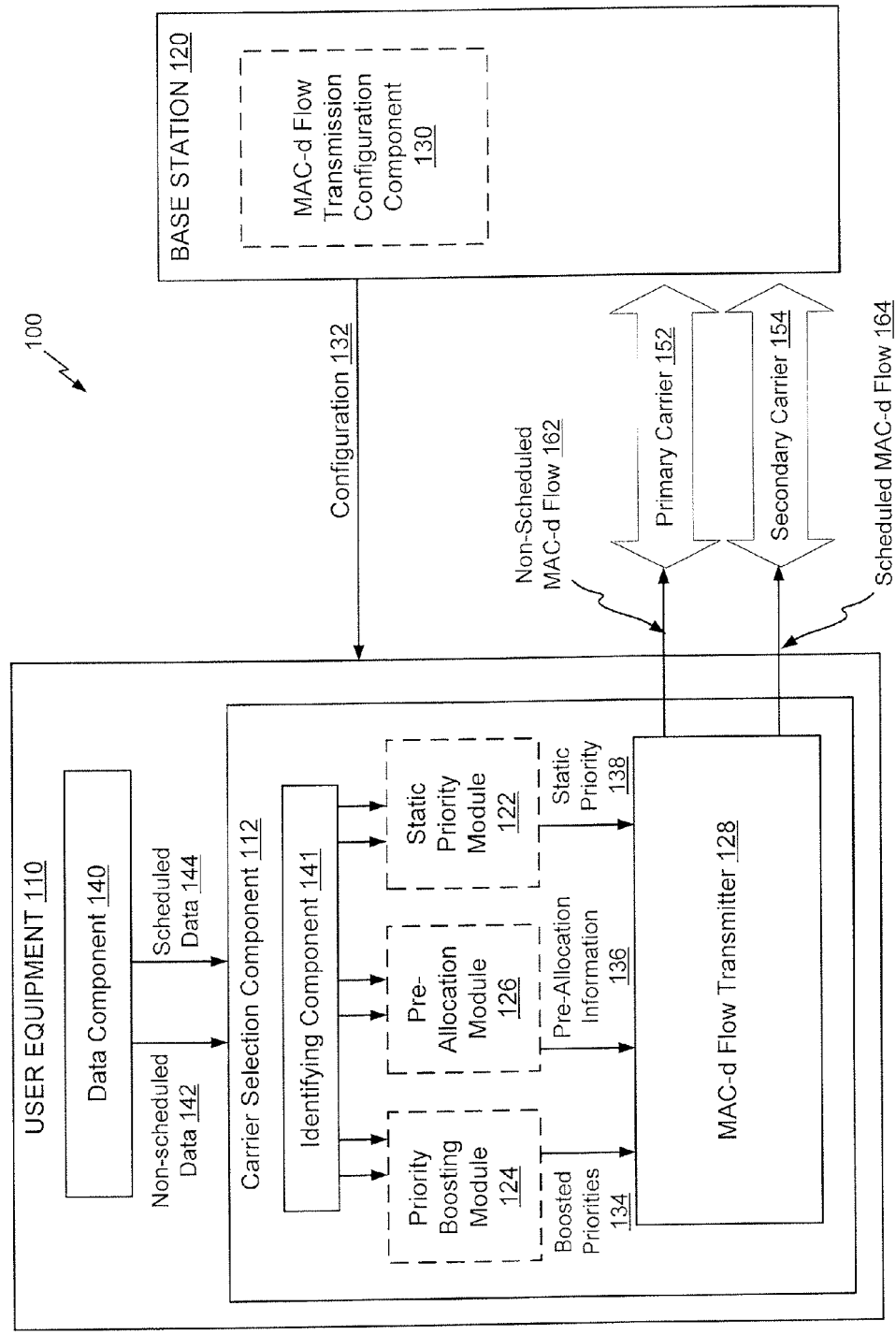
FIG. 1 is a diagram illustrating an example of a wireless communications network in which a user equipment and base station, having aspects configured to prioritize non-scheduled data, are in communication with one another.

Various aspects are now described with reference to the drawings. In the following description, for purposes of explanation, numerous specific details are set forth in order to provide a thorough understanding of one or more aspects. It may be apparent, however, that such aspect(s) may be practiced without these specific details.

A new behavior for prioritizing non-scheduled data at a user equipment (UE) according to one or more priority conditions is described. In an aspect, non-scheduled data may be prioritized to ensure that all of an amount of pre-allocated power, as described in the 3rd Generation Partnership Project (3GPP) Medium Access Control (MAC) Technical Specification (TS) 25.321 (e.g., at section 11.8.1.4 "E-TFC Selection"), entitled "Universal Mobile Telecommunications System (UMTS); Medium Access Control (MAC) protocol specification", which is publicly available, is applied to non-empty, non-scheduled MAC-d flows having a highest priority compared to other MAC-d flows. In an aspect, non-scheduled data may be prioritized by autonomously boosting the priority of non-scheduled data (which may be referred to as a boosted non-scheduled priority) if an initial non-scheduled priority is lower than the priority for scheduled data (which may be referred to as a scheduled priority) and/or if the non-scheduled data includes signaling radio bearer (SRB) data (e.g., control data rather than user data). In an aspect, non-scheduled data may be prioritized based on a network configuration whereby non-scheduled data is given a priority that is higher than scheduled data. One or more of the above-described aspects may be used when a UE is configured to transmit data over a primary frequency (or carrier) and a secondary frequency (or carrier). In other words, the UE may be configured to transmit according to dual-carrier or dual-cell functionality.

A high speed packet access (HSPA) air interface includes a series of enhancements to the 3rd Generation (3G)/Wideband Code Division Multiple Access (W-CDMA) air interface between a UE and a base station, which may be a Node B. The HSPA air interface may facilitate greater throughput and reduced latency for users. Among other modifications over prior standards, HSPA utilizes hybrid automatic repeat request (HARQ), shared channel transmission, and adaptive modulation and coding. The standards that define HSPA include high speed downlink packet access (HSDPA) and high speed uplink packet access (HSUPA, also referred to as enhanced uplink or EUL).

HSDPA was introduced in Release 5 of the 3GPP family of specifications. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between Release 5 HSDPA and the previously standardized circuit-switched air interface is the absence of soft handover in HSDPA. This means that HSDPA channels are transmitted to the UE from a single cell called the HSDPA serving cell. As the UE moves, or as one cell becomes preferable to another, the HSDPA serving cell may change. Still, the UE may be in soft handover on the associated DPCH, receiving the same information from plural cells.

The Release 6 family of specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

The 3GPP Release 9 family of specifications included a dual-carrier (or dual-cell) version of HSUPA, which may be referred to as DC-HSDPA. DC-HSUPA provides for an E-DCH to be transmitted on each of a primary carrier and a secondary carrier. In DC-HSUPA, packet scheduling is generally performed jointly over the two (or more) carriers, with scheduling decisions being based upon factors such as the CQI, the amount of data in the buffer, and quality of service (QoS) priorities. On the other hand, link adaptation and HARQ retransmissions are implemented on a per-carrier basis.

In the uplink direction, a scheduled flow is transmitted only when the scheduler at the Node B gives a grant, e.g., on one or both of the E-AGCH and/or the E-RGCH. The grant may vary during each transmission time interval (M). For example, if the network gives a UE a grant for 2000 bits in a particular TTI, the UE may then transmit 2000 bits of scheduled data on a scheduled flow on an uplink transmission.

The DC-HSUPA specifications also introduced a concept of "pre-allocation" of power for non-scheduled data. Here, a non-scheduled flow may be used to transmit to guaranteed data that the UE may transmit essentially whenever that data is ready to send. In DC-HSUPA, non-scheduled data is limited to transmissions on the primary uplink carrier (or frequency). Unlike scheduled data, and as the name suggests, non-scheduled data need not be scheduled by the network on a TTI basis by utilizing channels such as the E-AGCH or E-RCGH. Rather, the amount of non-scheduled data that may be transmitted by the UE is pre-configured utilizing a more permanent grant by the radio network controller (RNC), which is not influenced by the scheduler at the Node B.

Some data that typically utilizes a non-scheduled flow may include control data, e.g., Signaling Radio Bearer (SRB) data, or voice-over-IP (VoIP) data. These types of data generally have limited tolerance for delay or low data rates, and thus, scheduling these flows with a lower priority than other flows might result in degradation of the user experience.

In accordance with various aspects of the present disclosure, techniques are provided to address issues that may arise in a DC-HSUPA network wherein, under certain conditions, even though power has been pre-allocated to a non-scheduled flow, this non-scheduled flow might not be able to transmit at least a portion of the non-scheduled data.

Logical channels are generally assigned a priority by the network. That is, as part of radio bearer configuration signaling, the network may assign a priority to the logical channels, assign scheduled and non-scheduled MAC-d flows to respective logical channels, and in the case of non-scheduled data, allocate an amount of data that can be guaranteed to be transmitted on the uplink (via a MAC-d flow), as described above.

In a typical configuration for DC-HSUPA, a non-scheduled MAC-d flow is assigned to logical channels of higher priority than those to which a scheduled MAC-d flow is assigned. However, this order of priority is not required by the 3GPP family of standards (e.g., TS 25.321 at section 11.8.1.4). As such, it is allowed, and indeed possible, for a non-scheduled MAC-d flow to have a lower priority than a scheduled MAC-d flow. Another issue related to transmitting non-scheduled MAC-d flows is that in Release 9 DC-HSUPA, and as described above, non-scheduled data is limited to the primary carrier only. Another issue is that when a UE is operating in power limited conditions, in spite of the amount of power that has been pre-allocated to non-scheduled MAC-d flows, the amount of non-scheduled data that the UE can actually transmit on a non-scheduled MAC-d flow may be limited, or even unavailable.

These issues, and additional problems, may not arise if a non-scheduled MAC-d flow has a higher priority than a scheduled MAC-d flow, as will become clear below. That is, aspects of the present disclosure address the issue where all or part of non-scheduled data is not transmitted on an uplink when a non-scheduled MAC-d flow has a lower priority than a scheduled MAC-d flow.

In one example, assume that a non-scheduled MAC-d flow has 100 bytes of data, and its associated logical channel has a low priority. Further, a scheduled MAC-d flow has 2000 bytes of data, and its associated logical channel has a high priority. Further assume that a UE is operating under power-limited conditions and has a power headroom of 600 bytes meaning, in general, that at any particular time, the UE can only transmit 600 bytes of data due to the power limitation.

In this example, the UE may have a non-scheduled grant (NSG), which may be configured during the radio bearer configuration signaling, as described above. The NSG for the present example may be 200 bytes. The UE may receive a serving grant for the current TTI for 1000 bytes for the primary carrier frequency, and 1000 bytes for the secondary carrier frequency. That is, in this example, both carriers are given equal serving grants.

As per 3GPP TS 25.321 section 11.8.1.4, an amount of power is pre-allocated for transmission of non-scheduled data on a non-scheduled MAC-d flow if there is a nonzero amount of data available in the buffer (e.g., the non-scheduled MAC-d flow is non-empty). The pre-allocation of power for non-scheduled data that can be sent corresponds to the minimum of the non-scheduled data grant (NSG) (in this case, as described above, 200 bytes) and the amount of non-scheduled data available (in this case, as described above, 100 bytes). That is, the pre-allocated power is equal to MIN(200, 100)= 100. Thus, in the present example, the UE may transmit only up to 100 bytes using the pre-allocated power for the non-scheduled MAC-d flow.

Still referring to the present example, the remaining power for the uplink transmission is to be split between the two uplink carriers in accordance with certain power allocation rules defined by various 3GPP specifications. As described above, the power headroom is 600 bytes; therefore, subtracting the 100 bytes for the non-scheduled data leaves room for 500 bytes, which then may be split equally between the primary carrier and the secondary carrier: 250 bytes on the primary carrier and 250 bytes on the secondary carrier.

Thus, in this example, after the transmission pre-allocation of power and the split between the primary and secondary carriers, up to 100+250 bytes, or 350 bytes in total, can legitimately be transmitted on the primary carrier in the following TTI. For the secondary carrier, up to 250 bytes can be legitimately transmitted in the following TTI. As such, the UE may accordingly prepare and generate data for transmission during the following TTI beginning with the secondary carrier, and followed by the primary carrier.

However, two contradictory clauses in the 3GPP TS 25.321 protocol specification (which also may be referred to as the MAC specification) result in an ambiguity which, depending on how the language is interpreted, can result in one of two possibilities for how data to be transmitted by a UE will be allocated among the two uplink carriers.

To illustrate this ambiguity, the following excerpt is taken from the 3GPP MAC specification: specifically, 3GPP TS 25.321, V9.9.0, Section 11.8.1.4: E-TFC Selection:

RRC can control the scheduling of uplink data by giving each logical channel a priority between 1 and 8, where 1 is the highest priority and 8 the lowest. E-TFC selection in the UE shall be done in accordance with the priorities indicated by RRC. Logical channels have absolute priority, i.e. the UE shall maximise the transmission of higher priority data.

RRC can allocate non-scheduled transmission grants to individual MAC-d flows in order to reduce the transmission delays. Non-scheduled transmissions are only allowed on the Primary Uplink Frequency. When a 2 ms TTI is configured each non-scheduled grant is applicable to the specific set of HARQ processes indicated by RRC. The applicability of scheduled grants can be also restricted to a specific set of HARQ processes when a 2 ms TTI is configured. HARQ process restriction and reservation is under the control of the serving cell Node B and indicated to the UE by RRC.

When the UE has more than one Activated Uplink Frequency, if the E-TFC selection in this TTI is invoked by HARQ entities on more than one of the Activated Uplink Frequencies or if the HARQ entities on all Activated Uplink Frequencies in this TTI are generating retransmissions, the maximum remaining power allowed for E-DCH transmission on each Activated Uplink Frequency is determined by:

The power pre-allocated for non-empty non-scheduled MAC-d flows. The amount of power pre-allocated for a non-empty non-scheduled flow shall be the minimum of the power necessary to transmit data up to the non-scheduled grant for this flow, and the power necessary to transmit all the data in the queue for this flow taking into account the power offset for a transmission of the HARQ profile of the MAC-d flow with the highest-priority among "non-scheduled" non-empty MAC-d flows.

Under one interpretation of the excerpted language, the requirement from the last paragraph: "The power pre-allocated for non-empty non-scheduled MAC-d flows . . . ," may be strictly obeyed. As such, and referring again to the example described above, at the next TTI transmission, 250 bytes of scheduled data would be transmitted for the secondary carrier. For the primary carrier, 100 bytes of non-scheduled data and 250 bytes of scheduled data would be transmitted. That is, under this interpretation, all the data that is allowed (as described above) to be transmitted on each carrier, is indeed transmitted on each carrier.

However, under a different interpretation, the requirement from the first paragraph: ". . . E-TFC selection in the UE shall be done in accordance with the priorities indicated by RRC. Logical channels have absolute priority, i.e. the UE shall maximize the transmission of higher priority data," may be strictly obeyed. As such, and referring again to the above-described example, at the next TTI transmission, 250 bytes of scheduled data would be transmitted for the secondary carrier. For the primary carrier, 350 bytes of scheduled data would be transmitted. As such, the non-scheduled data would not be transmitted due to its lower priority.

Thus, two different UE behaviors may result from these two different interpretations. That is, under one interpretation, the UE might not be able to transmit part or all of its non-scheduled data in the current TTI. Under the other interpretation, non-scheduled data would be transmitted with the guaranteed pre-allocated power, but the UE would be disobeying (e.g., ignoring) the required flow priority.

If a non-scheduled MAC-d flow is not able to send its data, various issues may arise. For example, non-scheduled MAC-d flows are typically used to transmit control data, e.g., signaling radio bearer (SRB) messages, which may include important information such as measurements carrying radio condition information, uplink control protocol data units (PDU) acknowledging downlink signaling PDUs, and/or the like. Thus, if such data is not transmitted, an important SRB message might not be transmitted on the uplink, potentially resulting in a call drop.

Therefore, in accordance with the present aspects, techniques to reduce or prevent such issues are described to enable non-scheduled MAC-d flows to transmit data on uplink transmissions in a predictable fashion and according to one or more priority conditions.

In an aspect, all of an amount of power pre-allocated for non-scheduled MAC-d flows may be applied to non-empty non-scheduled MAC-d flows with a priority condition of the non-scheduled MAC-d flow having the highest priority. In this way, the problem scenario can be avoided by preventing any non-scheduled flow having a low non-scheduled priority (as compared to a relatively higher scheduled priority of a scheduled flow) from utilizing the pre-allocated power that was set aside for the non-scheduled non-empty MAC-d flows. In one example, for the pre-allocated power, the UE may allocate non-scheduled data to be transmitted only on a non-scheduled flow of the highest priority.

In an aspect, a UE may autonomously adjust the priority of a non-scheduled MAC-d flow based on a priority condition that the non-scheduled MAC-d flow is configured with a lower priority than that of a scheduled MAC-d flow. That is, the UE can choose not to respect the priority assigned by the network in such a way that the non-scheduled data is sent as it would be sent if it had a higher priority. For example, if a UE configured for DC-HSUPA has a non-scheduled MAC-d flow configured by the network to have a lower, non-scheduled priority, the UE can send the non-scheduled (of lower priority) data before scheduled data (of higher priority).

Similarly, and also according to the above aspect, a UE may be configured to autonomously adjust the priority of a non-scheduled MAC-d flow if that flow is configured with a lower priority and certain priority conditions are present. These priority conditions may be determined at the UE. For example, one such condition may be whether the non-scheduled MAC-d flow would be used for sending non-scheduled signaling or control data (e.g., Signaling Radio Bearer (SRB) data), rather than for data traffic (e.g., VoIP data). Other conditions that may be used may be data size, traffic frequency, radio bearer ID, or another suitable parameter that might enable differentiation between signaling data and/or user traffic. Here, and based on any one or more of these conditions, the UE may determine to boost the priority of the non-scheduled MAC-d flow to, for example, the highest priority or a priority that is higher than any scheduled MAC-d flow. That is, whether a MAC-d flow is non-scheduled or scheduled, the priority of SRB data may be boosted. As discussed above, the SRB data is of high concern because if it is not transmitted at the appropriate time, a call may be missed and/or dropped. Thus, a limited boost to the priority of a MAC-d flow may be implemented by the UE for SRB data.

In an aspect, the network may provide a priority condition to a UE that configures the UE to grant a higher priority to non-scheduled data than to scheduled data when a UE is configured for dual carrier frequencies (e.g., DC-HSUPA). In this way, the above-described issues can be avoided, as a non-scheduled MAC-d flow would not have a lower priority than a scheduled MAC-d flow.

Referring to FIG. 1, a wireless communications network 100 includes a user equipment (UE) 110 in communication with a base station 120. In the example of FIG. 1, UE 110 is configured for dual carrier frequencies (e.g., DC-HSUPA), such that it may communicate with base station 120 via a primary carrier (or frequency) 152 and/or a secondary carrier (or frequency) 154. It will be understood, however, that at least some of the present aspects may be applied to a wireless communication network having included therein a UE and/or base station that are not configured for dual carrier frequencies.

The UE 110 also may be referred to as a mobile apparatus, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Base station 120, which also may be referred to as an access point or node, may be a macrocell, picocell, femtocell, relay, Node B, mobile Node B, UE (e.g., communicating in peer-to-peer or ad-hoc mode with UE 110), or substantially any type of component that can communicate with UE 110 to provide wireless network access.

UE 110 includes carrier selection component 112 configured to determine how to transmit scheduled and non-scheduled data on scheduled and non-scheduled MAC-d flows, respectively, according to the present aspects. More particularly, carrier selection component 112 may be configured to prioritize non-scheduled data on non-scheduled MAC-d flows over scheduled data on scheduled MAC-d flows according to the present aspects.

Carrier selection component 112 includes identifying component 141 configured to identify and/or receive non-scheduled data 142 from a data component 140 to be transmitted on a non-scheduled MAC-d flow 162. The non-scheduled MAC-d flow 162 may be associated with a particular priority level, which may be referred to as a non-scheduled priority. In an aspect, a logical channel associated with the non-scheduled MAC-d flow 162 may be assigned a priority (e.g., 1 to 8, where 1 is the highest and 8 is the lowest) by the network as per the MAC specification TS 25.321 section 11.8.1.4 "E-TFCI Selection". The priority of the logical channel associated with a particular MAC-d flow also may be referred to as being the priority for the particular MAC-d flow itself.

Similarly, identifying component 141 may be configured to identify and/or receive scheduled data 144 from a data component 140 to be transmitted on a scheduled MAC-d flow 164. The scheduled MAC-d flow 164 may be associated with a scheduled priority, which may be a priority for a logical channel associated with the scheduled MAC-d flow 164.

Carrier selection component 112 includes MAC-d flow transmitter 128 configured to transmit the non-scheduled MAC-d flow 162 and the scheduled MAC-d flow 164 according to the non-scheduled priority and the scheduled priority.

In an aspect, carrier selection component 112 includes pre-allocation module 126 configured to prioritize non-scheduled data 142 over scheduled data 144. Pre-allocation module 126 may be configured to receive a configuration 132 from base station 120. Configuration 132 may be generated by base station 120 by MAC-d flow transmission configuration component 130 configured to provide information and/or instructions to UE 110 related to transmitting MAC-d flows over dual carriers, e.g., primary carrier 152 and secondary carrier 154. The MAC-d flow transmission configuration component 130 may generate configuration 132 based on information and/or instructions received from the network, constraints and/or a specific configuration of UE 110, and/or the like. Base station 120 may provide configuration 132 to UE 110 upon the establishment of the connection between base station 120 and UE 110 and/or at some other time. The configuration 132 may be static or dynamic.

According to the above aspect, configuration 132 may be a pre-allocation of power for a non-empty, non-scheduled MAC-d flow. Pre-allocation module 126 may be configured with a comparator function to determine that the non-scheduled priority associated with the non-scheduled MAC-d flow 162 is a highest priority as compared with at least the scheduled priority, associated with scheduled MAC-d flow 164 and the priority of any other flows and/or logical channels. Once pre-allocation module 126 has both received the pre-allocation of power (e.g., configuration 132) and determined that the non-scheduled priority is the highest priority, pre-allocation module 126 may be configured with a generator function to generate, and output to MAC-d flow transmitter 128, pre-allocation information 136, which indicates that both of the above conditions have been met. As such, and in an aspect, pre-allocation information 136 may be a single bit or flag, which has been turned "on" to indicate that the pre-allocation of power was received and that the scheduled MAC-d flow 164 has the highest priority among all flows. If one or both of these conditions are not met, and in an aspect, pre-allocation information 136 may output an "off" bit or flag; in another aspect, pre-allocation information 136 may not generate and output pre-allocation information 136. In an aspect, pre-allocation information 136 also may include an indication of the pre-allocation of power provided by configuration 132.

In the present example, where configuration 132 is a pre-allocation of power, MAC-d flow transmitter 128 may receive pre-allocation information 136. In response, MAC-d flow transmitter 128 may be configured with a power application function to apply the pre-allocated power to the non-scheduled MAC-d flow 162. More particularly, the pre-allocated power may be used for transmission of non-scheduled MAC-d flows having the highest priority of all flows, rather than non-scheduled MAC-d flows having comparatively lower priorities and/or scheduled MAC-d flows. Thus, any issues associated with potential ambiguity in interpreting the MAC specification TS 25.321 section 11.8.1.4 "E-TFC Selection" with respect to pre-allocating power for non-scheduled MAC-d flows is obviated—the pre-allocation of power is applied to non-scheduled MAC-d flows having a highest priority among all flows.

MAC-d flow transmitter 128 may be configured with a transmit function to transmit the non-scheduled data 142 on non-scheduled MAC-d flow 162 using the pre-allocated power.

In another aspect, carrier selection component 112 may include priority boosting module 124 configured with an adjustment function to prioritize non-scheduled data 142 based on configuration 132. In one example of this aspect, configuration 132 may be an assignment of a first logical channel, such as, for example, primary carrier 152, for non-scheduled MAC-d flow 162 and an assignment of a second logical channel, such as, for example, secondary carrier 154, for scheduled MAC-d flow 164. As such, priority boosting module 124 may be configured to receive, as configuration 132, an assignment for non-scheduled MAC-d flow 162 to a first logical channel, e.g., primary carrier 152. The first logical channel may have associated therewith a particular priority, which may be referred to as a non-scheduled priority since the first logical channel has been assigned to non-scheduled MAC-d flow 162. Priority boosting module 124 also may be configured to receive, also as configuration 132, an assignment for scheduled MAC-d flow 164 to a second logical channel, e.g., secondary carrier 154. The second logical channel may have associated therewith a particular priority, which may be referred to as a scheduled priority since the second logical channel has been assigned to scheduled MAC-d flow 164. Priority boosting module 124 may be configured with a comparator function to determine that the non-scheduled priority (e.g., for primary carrier 152) is a lower priority than the scheduled priority (e.g., for secondary carrier 154).

In another example of the above aspect, carrier selection component 112 may include priority boosting module 124 configured to prioritize non-scheduled data 142 based on whether non-scheduled data 142 is signaling (or control) data or user data, and without reference to configuration 132. More particularly, priority boosting module 124 may be configured with a data determination function to determine that the non-scheduled MAC-d flow 162 is carrying signaling radio bearer (SRB) data, rather than user data. The data determination function of priority boosting module 124 may so determine by examining data size, traffic frequency, radio bearer ID, and/or any other suitable parameter that might enable differentiation between signaling data and/or user traffic. Priority boosting module 124 also may be configured with a comparator function to determine that the non-scheduled priority is a lower priority than the scheduled priority.

In either case, and in response to the determinations, priority boosting module 124 may be configured with the adjustment function to adjust the non-scheduled priority to be a higher priority than the scheduled priority. In a non-limiting example, if the non-scheduled priority is 6 and the scheduled priority is 4, priority boosting module 124 may be configured to boost the non-scheduled priority so that it is higher than the scheduled priority by, for example, adjusting the non-scheduled priority to 3. In another aspect, priority boosting module 124 may be configured to lower or reduce the scheduled priority, rather than boosting the non-scheduled priority, to achieve the same effect.

Priority boosting module 124 may be configured with a generate and output function to generate, and output to MAC-d flow transmitter 128, boosted priorities 134. In an aspect, boosted priorities 134 may include an indication of the boosted, non-scheduled priority or both the boosted non-scheduled priority and the original (e.g., non-adjusted) scheduled priority. In another aspect, boosted priorities 134 may include an indication of the lowered scheduled priority or both the lowered scheduled priority and the original (e.g., non-adjusted) non-scheduled priority. Upon receipt of boosted priorities 134, MAC-d flow transmitter 128 may be configured to transmit non-scheduled MAC-d flow 162 on primary carrier 152 and scheduled MAC-d flow 164 on secondary carrier 154 based on the boosted priorities 134.

In a further aspect, carrier selection component 112 may include a static priority module 122 configured with a prioritization function to prioritize non-scheduled data 142 over scheduled data 144. More particularly, static priority module 122 may be configured with a receiver function to receive non-scheduled data 142 and scheduled data 144. Upon receipt of the non-scheduled data 142 and the scheduled data 144, the prioritization function of static priority module 122 may be configured to prioritize non-scheduled data 142 over scheduled data 144, such that non-scheduled MAC-d flow 162 is prioritized over scheduled MAC-d flow 164. Static priority module 122 may be configured with a generate and output function to generate, and output to MAC-d flow transmitter 128, static priority 138. Static priority 138 may be a flag or bit, which indicates to MAC-d flow transmitter 128 that, according to the present aspects where carrier selection component 112 includes static priority module 122, non-scheduled data 142, and thus non-scheduled MAC-d flow 162, is to be prioritized over scheduled data 144 and thus scheduled MAC-d flow 164. In an aspect, the static priority 138 may continue to apply unless, and until, static priority module 122 determines, or is otherwise configured to, allow MAC-d flow transmitter 128 to transmit according to another priority scheme (e.g., non-scheduled MAC-d flow 162 is not to be always prioritized over scheduled MAC-d flow 164). Upon receipt of static priority 138, MAC-d flow transmitter 128 may be configured to transmit non-scheduled MAC-d flow 162 and scheduled MAC-d flow 164 accordingly.

Figure 2:
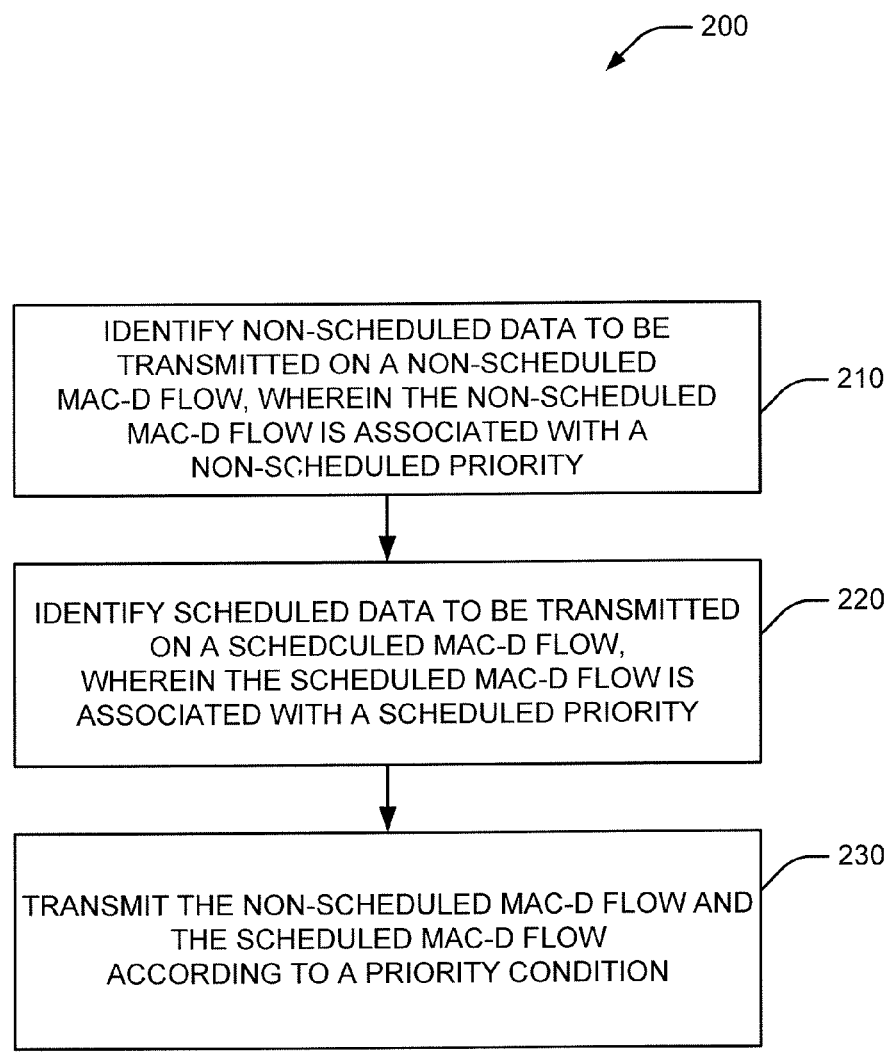
FIG. 2 is a flow chart of a method for prioritizing non-scheduled data according to the present aspects.

Referring to FIG. 2, aspects of a method 200 for prioritizing non-scheduled data may be performed by UE 110 in communication with base station 120, both of FIG. 1. More particularly, aspects of method 200 may be performed by data component 140, identifying component 141, carrier selection component 112, and/or MAC-d flow transmitter 128.

At 210, the method 200 includes identifying non-scheduled data to be transmitted on a non-scheduled MAC-d flow, wherein the non-scheduled MAC-d flow is associated with a non-scheduled priority. For example, identifying component 141 may be configured to identify and/or receive non-scheduled data 142 to be transmitted on non-scheduled MAC-d flow 162. Non-scheduled MAC-d flow 162 may be associated with a priority that may be referred to as a non-scheduled priority. The non-scheduled priority may, in an aspect, be a priority associated with a logical channel (e.g., primary carrier 152) on which non-scheduled MAC-d flow 162 is to be transmitted.

At 220, the method 200 includes identifying scheduled data to be transmitted on a scheduled MAC-d flow, wherein the scheduled MAC-d flow is associated with a scheduled priority. For example, identifying component 141 may be configured to identify and/or receive scheduled data 144 to be transmitted on scheduled MAC-d flow 164. Scheduled MAC-d flow 164 may be associated with a priority that may be referred to as a scheduled priority. The scheduled priority may, in an aspect, be a priority associated with a logical channel (e.g., secondary carrier 154) on which scheduled MAC-d flow 164 is to be transmitted.

At 230, the method 200 includes transmitting the non-scheduled MAC-d flow and the scheduled MAC-d flow according to the non-scheduled priority and the scheduled priority. For example, MAC-d flow transmitter 128 may be configured to transmit the non-scheduled MAC-d flow 162 according to the non-scheduled priority and the scheduled priority.

Figure 3:
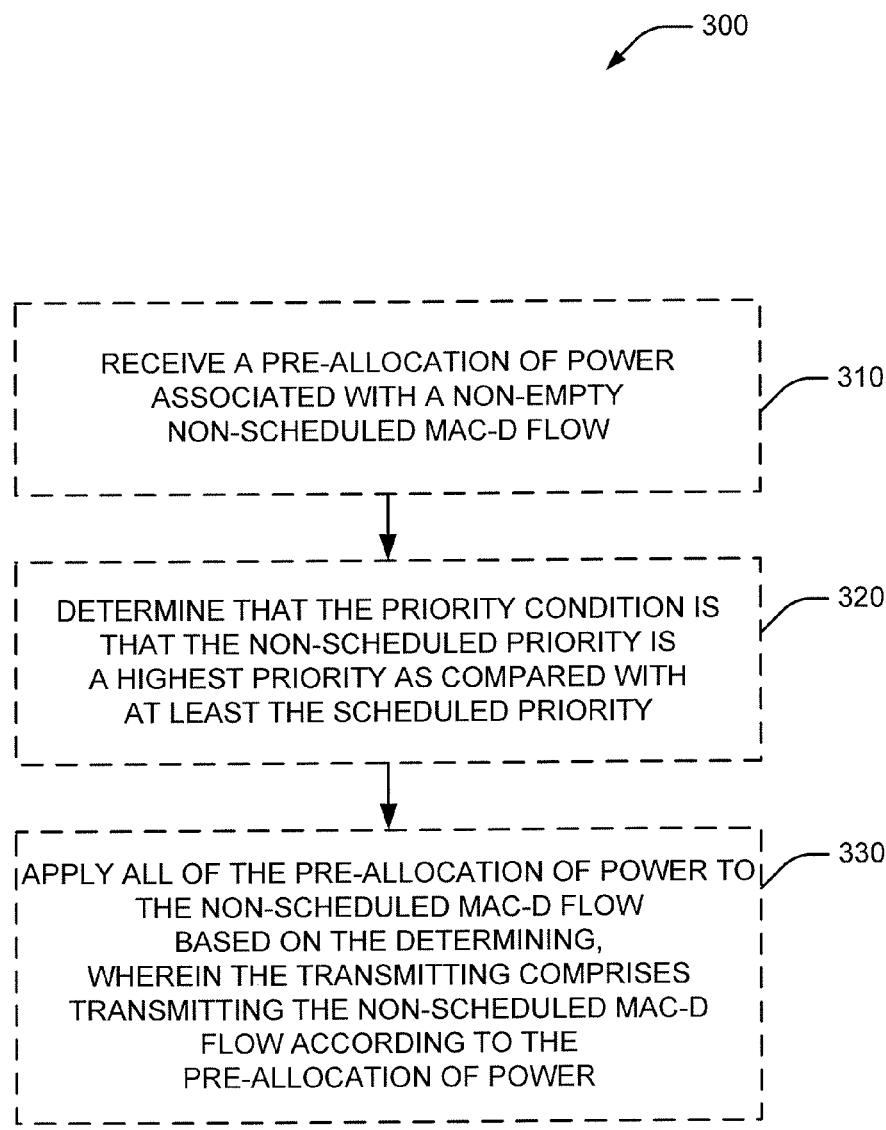
FIG. 3 is a flow chart of additional, optional aspects of the method of FIG. 2 for prioritizing non-scheduled data, according to one aspect.

Referring to FIG. 3, aspects of a method 300 for prioritizing non-scheduled data may be performed by UE 110 in communication with base station 120, both of FIG. 1. Method 300 may be performed by UE 110 in addition to performing aspects of method 200 of FIG. 2 and according to the aspects described herein. More particularly, aspects of method 300 may be performed by carrier selection component 112, pre-allocation module 126, and/or MAC-d flow transmitter 128.

At 310, the method 300 includes receiving a pre-allocation of power associated with a non-empty non-scheduled MAC-d flow. For example, pre-allocation module 126 may be configured with a receive function to receive configuration 132, which may be a pre-allocation of power for non-empty non-scheduled MAC-d flows. In an aspect, configuration 132 may be generated by MAC-d flow transmission configuration component 130 of base station 120 and output to UE 110.

At 320, the method 300 includes determining that the priority condition is that the non-scheduled priority is a highest priority as compared with at least the scheduled priority. For example, pre-allocation module 126 may be configured with a comparator function to determine that the non-scheduled priority (associated with non-scheduled MAC-d flow 162) is a highest priority as compared with at least the scheduled priority (associated with scheduled MAC-d flow 164). In response thereto, pre-allocation module 126 may be configured with a generate and output function to generate, and output to MAC-d flow transmitter 128, pre-allocation information 136. In an aspect, pre-allocation information 136 may be a single bit or flag, which has been turned "on" to indicate that the pre-allocation of power was received and that the scheduled MAC-d flow 164 has the highest priority among all flows. If one or both of these conditions are not met, and in an aspect, pre-allocation information 136 may output an "off" bit or flag; in another aspect, pre-allocation information 136 may not generate and output pre-allocation information 136.

At 330, the method 300 includes applying all of the pre-allocation of power to the non-scheduled MAC-d flow based on the determining, wherein the transmitting comprises transmitting the non-scheduled MAC-d flow according to the pre-allocation of power. For example, MAC-d flow transmitter 128 may be configured with a power application function to apply all of the pre-allocated power to the non-scheduled MAC-d flow 162. MAC-d flow transmitter 128 may be further configured with a transmit function to transmit the non-scheduled MAC-d flow 162 according to the pre-allocation of power. More particularly, MAC-d flow transmitter 128 may be configured to use the pre-allocated power for transmission of non-scheduled MAC-d flows having the highest priority of all flows, and not use the pre-allocated power for transmission of non-scheduled MAC-d flows having lower relative priority and/or scheduled MAC-d flows.

Figure 4:
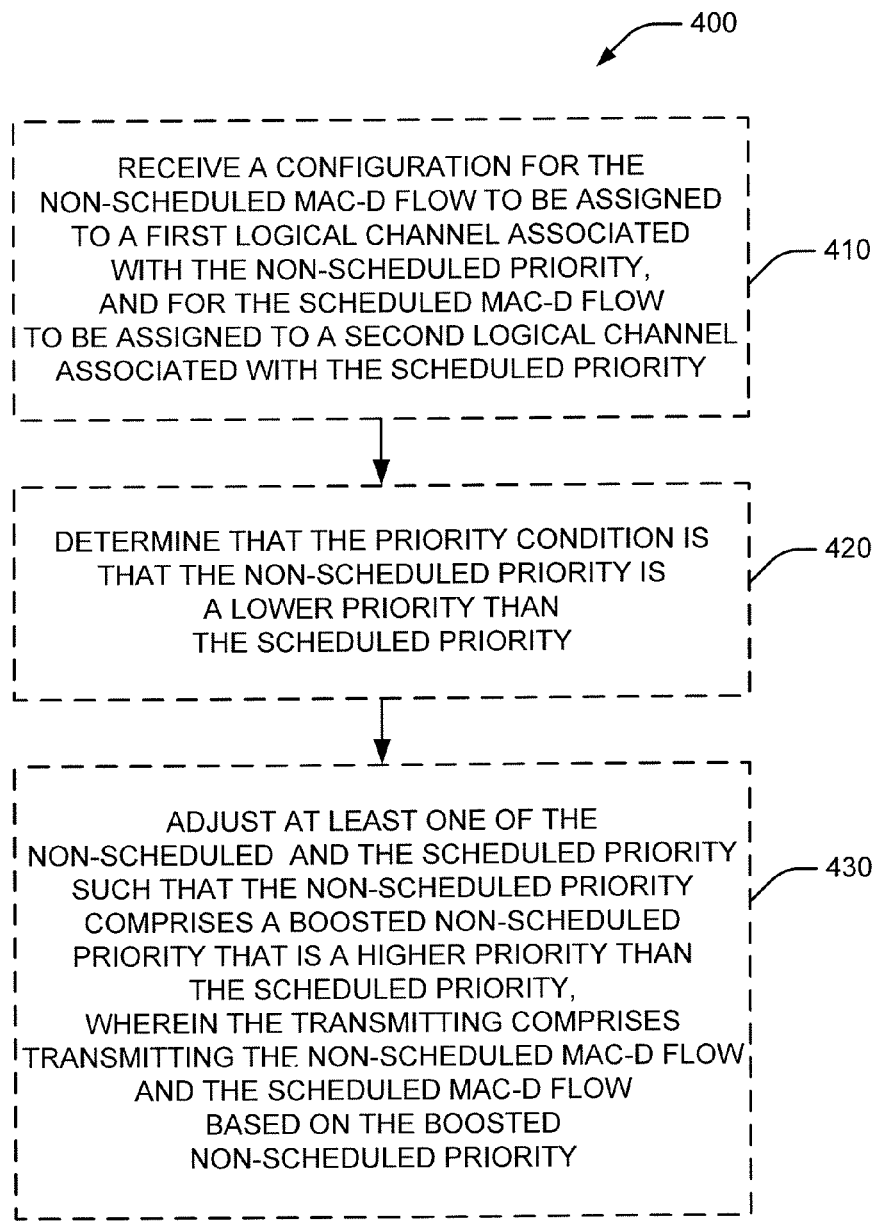
FIG. 4 is a flow chart of additional, optional aspects of the method of FIG. 2 for prioritizing non-scheduled data, according to one aspect.

Referring to FIG. 4, aspects of a method 400 for prioritizing non-scheduled data may be performed by UE 110 in communication with base station 120, both of FIG. 1. Method 400 may be performed by UE 110 in addition to performing aspects of method 200 of FIG. 2 and according to the aspects as described herein. More particularly, aspects of method 400 may be performed by carrier selection component 112, priority boosting module 124, and/or MAC-d flow transmitter 128.

At 410, the method 400 includes receiving a configuration for the non-scheduled MAC-d flow to be assigned to a first logical channel associated with the non-scheduled priority, and for the scheduled MAC-d flow to be assigned to a second logical channel associated with the scheduled priority, wherein the non-scheduled priority is a lower priority than the scheduled priority. For example, priority boosting module 124 may be configured with a receive function to receive configuration 132, from base station 120, assigning non-scheduled MAC-d flow 162 to a first logical channel, such as, for example, primary carrier 152, having associated therewith the non-scheduled priority. Priority boosting module 124 also may be configured with a receive function to receive configuration 132 assigning scheduled MAC-d flow 164 to a second logical channel, such as, for example, secondary carrier 154, having associated therewith the scheduled priority. In an aspect, configuration 132 may be generated by MAC-d flow transmission configuration component 130 of base station 120 and output to UE 110. At 420, the method 400 includes determining that the priority condition is that the non-scheduled priority is a lower priority than the scheduled priority. For example, priority boosting module 124 may be configured with a comparator function to determine that the non-scheduled priority is a lower priority than the scheduled priority.

At 430, the method 400 includes adjusting at least one of the non-scheduled priority and the scheduled priority such that the non-scheduled priority comprises a boosted non-scheduled priority that is a higher priority than the scheduled priority, wherein the transmitting comprises transmitting the non-scheduled MAC-d flow and the scheduled MAC-d flow based on the boosted non-scheduled priority. For example, and in one aspect, priority boosting module 124 may be configured with an adjustment function to boost the non-scheduled priority to be a higher priority than the scheduled priority. In another example, and another aspect, priority boosting module 124 may be configured with an adjustment function to lower or reduce the scheduled priority, rather than boosting the non-scheduled priority, to achieve the same effect.

Upon receiving the configuration 132 and boosting the non-scheduled priority, priority boosting module 124 may be configured with a generate and output function to generate, and output to MAC-d flow transmitter 128, boosted priorities 134. In an aspect, boosted priorities 134 may include an indication of the boosted, non-scheduled priority or both the boosted non-scheduled priority and the original (e.g., non-adjusted) scheduled priority. In another aspect, boosted priorities 134 may include an indication of the lowered scheduled priority or both the lowered scheduled priority and the original (e.g., non-adjusted) non-scheduled priority. Upon receipt of boosted priorities 134, MAC-d flow transmitter 128 may be configured with a transmit function to transmit non-scheduled MAC-d flow 162 on primary carrier 152 and scheduled MAC-d flow 164 on secondary carrier 154 based on the boosted priorities 134.

Figure 5:
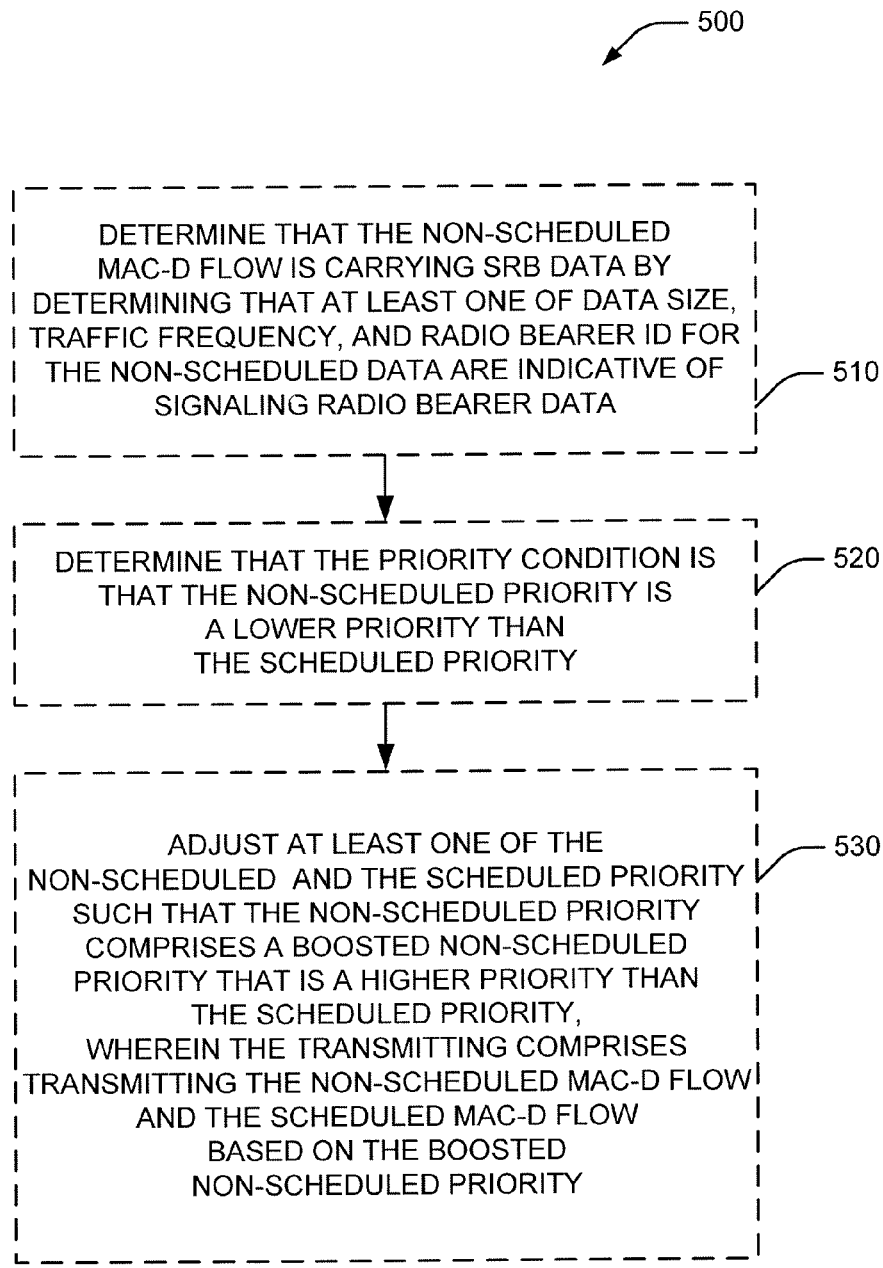
FIG. 5 is a flow chart of additional, optional aspects of the method of FIG. 2 for prioritizing non-scheduled data, also according to one aspect.

Referring to FIG. 5, aspects of a method 500 for prioritizing non-scheduled data may be performed by UE 110 in communication with base station 120, both of FIG. 1. Method 500 may be performed by UE 110 in addition to performing aspects of method 200 of FIG. 2 and also according to the aspects as described herein. More particularly, aspects of method 500 may be performed by carrier selection component 112, priority boosting module 124, and/or MAC-d flow transmitter 128.

At 510, the method 500 includes determining that the non-scheduled MAC-d flow is carrying signaling radio bearer (SRB) data. For example, priority boosting module 124 may be configured with a data determination function to determine that the non-scheduled data 142, to be transmitted on non-scheduled MAC-d flow 162, is carrying signaling radio bearer (SRB) data. In an aspect, the data determination function of priority boosting module 124 may determine that the non-scheduled MAC-d flow 162 is carrying SRB data by examining data size, traffic frequency, radio bearer ID, and/or any other suitable parameter that might enable differentiation between signaling data and/or user traffic.

At 520, the method 500 includes determining that the priority condition is that the non-scheduled priority is a lower priority than the scheduled priority. For example, priority boosting module 124 may be configured with a comparator function to determine that the non-scheduled priority is a lower priority than the scheduled priority.

At 530, the method 500 includes adjusting at least one of the non-scheduled priority and the scheduled priority such that the non-scheduled priority comprises a boosted non-scheduled priority that is a higher priority than the scheduled priority, wherein the transmitting comprises transmitting the non-scheduled MAC-d flow and the scheduled MAC-d flow based on the boosted non-scheduled priority. For example, and in one aspect, priority boosting module 124 may be configured with an adjustment function to boost the non-scheduled priority to be a higher priority than the scheduled priority. In another example and aspect, priority boosting module 124 may be configured with an adjustment function to lower or reduce the scheduled priority, rather than boosting the non-scheduled priority, to achieve the same effect. Priority boosting module 124 may be configured with a generate and output function to generate, and output to MAC-d flow transmitter 128, boosted priorities 134. In an aspect, boosted priorities 134 may include an indication of the boosted, non-scheduled priority or both the boosted non-scheduled priority and the original (e.g., non-adjusted) scheduled priority. In another aspect, boosted priorities 134 may include an indication of the lowered scheduled priority or both the lowered scheduled priority and the original (e.g., non-adjusted) non-scheduled priority. Upon receipt of boosted priorities 134, MAC-d flow transmitter 128 may be configured with a transmit function to transmit non-scheduled MAC-d flow 162 on primary carrier 152 and scheduled MAC-d flow 164 on secondary carrier 154 based on the boosted priorities 134.

Figure 6:
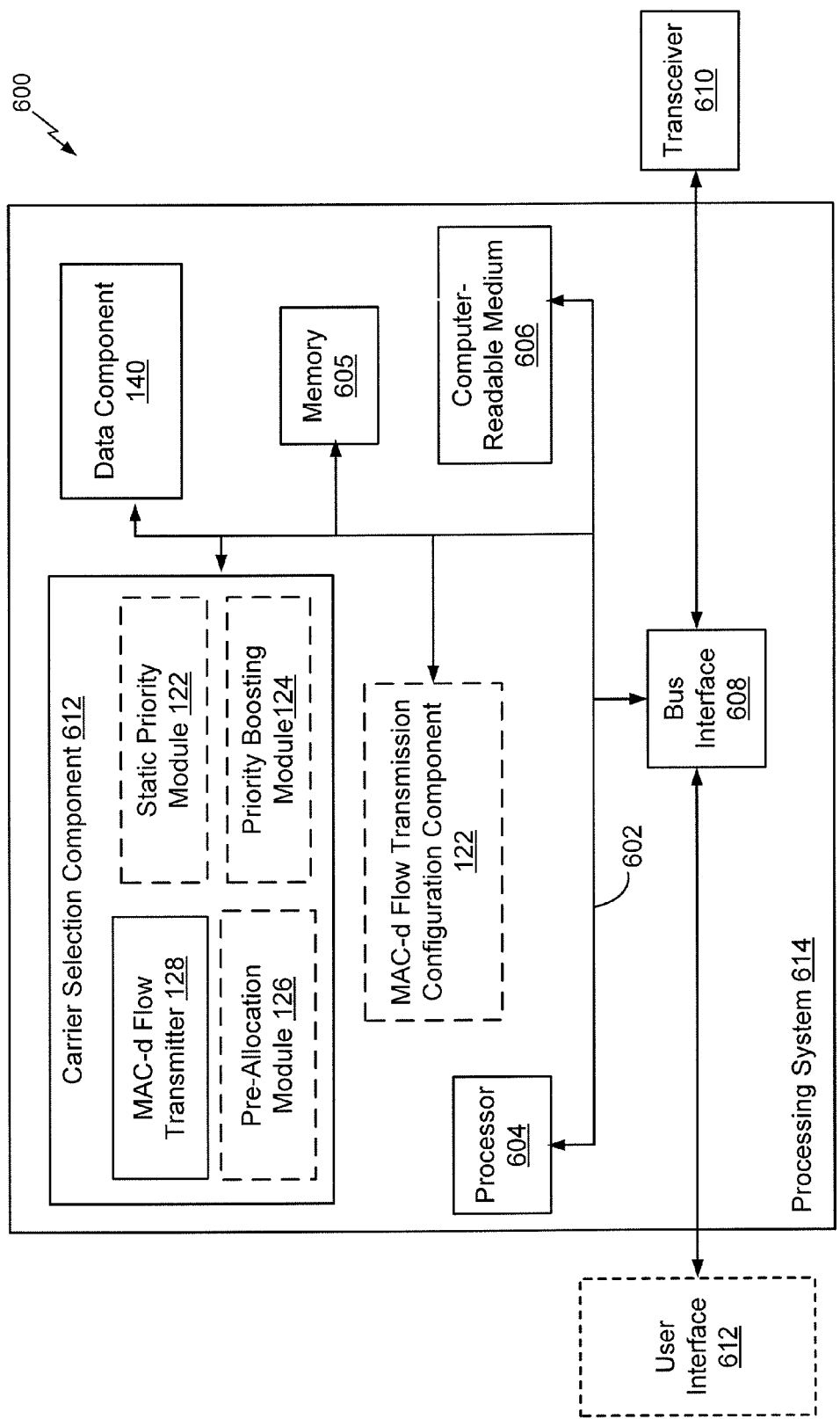
FIG. 6 is a diagram illustrating an example of a hardware implementation for an apparatus employing a processing system having aspects configured to prioritize non-scheduled data.

FIG. 6 is a conceptual diagram illustrating an example of a hardware implementation for an apparatus 600 employing a processing system 614 having aspects configured to prioritize non-scheduled data as described herein. The apparatus 600 may be UE 110 and/or base station 120 of FIG. 1. In accordance with various aspects of the disclosure, an element, or any portion of an element, or any combination of elements may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). In an aspect where apparatus 600 is a base station, such as base station 120 of FIG. 1, the bus 602 also may link MAC-d flow transmission configuration component 130. In an aspect where apparatus 600 is a UE, such as UE 110 of FIG. 1, the bus 602 also may link together data component 140 and carrier selection component 112, including MAC-d flow transmitter and, optionally according to the various aspects described herein, pre-allocation module 126, priority boosting module 124, static priority module 122, respectively. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described herein for prioritizing non-scheduled data for any particular apparatus. The computer-readable medium 606 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The various concepts presented throughout this disclosure may be implemented across a broad variety of telecommunication systems, network architectures, and communication standards.

Figure 7:
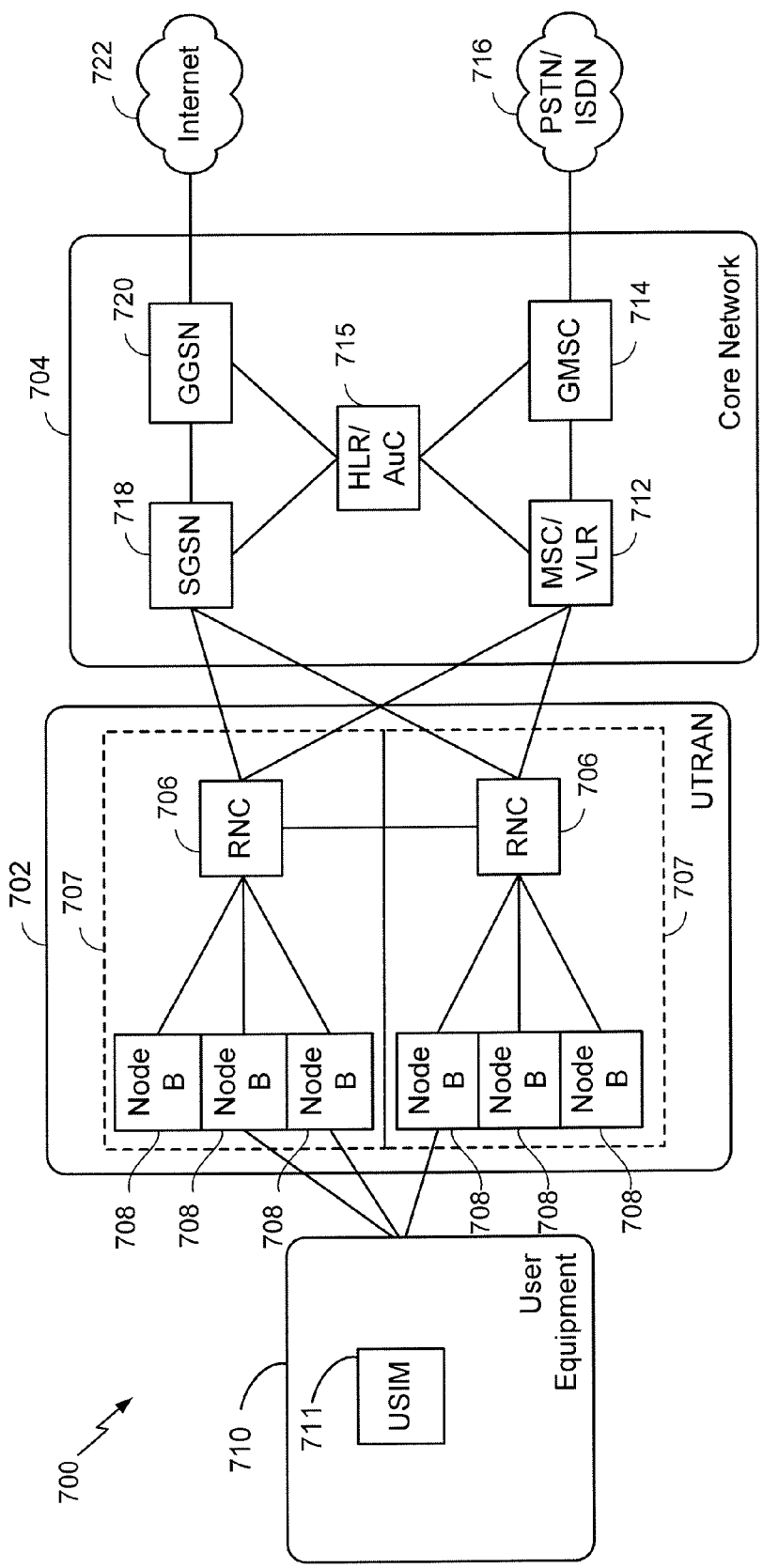
FIG. 7 is a diagram illustrating an example of a telecommunications system having aspects configured to prioritize non-scheduled data.

Referring now to FIG. 7, as an illustrative example without limitation, various aspects of the present disclosure are illustrated with reference to a Universal Mobile Telecommunications System (UMTS) system 700 in which a UE 710, which may be the same as or similar to UE 110 of FIG. 1, has aspects configured to prioritize non-scheduled data as described herein. A UMTS network includes three interacting domains: a core network 704, a radio access network (RAN) (e.g., the UMTS Terrestrial Radio Access Network (UTRAN) 702), and UE 710.

Among several options available for a UTRAN 702, in this example, the illustrated UTRAN 702 may employ a W-CDMA air interface for enabling various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the illustrated RNCs 706 and RNSs 707. The RNC 706 is an apparatus responsible for, among other things, assigning, reconfiguring, and releasing radio resources within the RNS 707. The RNC 706 may be interconnected to other RNCs (not shown) in the UTRAN 702 through various types of interfaces such as a direct physical connection, a virtual network, or the like using any suitable transport network.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708, which may be the same as or similar to base station 120 of FIG. 1, are shown in each RNS 707; however, the RNSs 707 may include any number of wireless Node Bs. The Node Bs 708 provide wireless access points to a core network 704 for any number of user equipment, such as UE 710. Examples of UE 710 include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning type of device. The term user equipment (UE) is commonly used in UMTS applications, but UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The downlink (DL), also called the forward link, refers to the communication link from a Node B 708 to a UE 710 and the uplink (UL), also called the reverse link, refers to the communication link from a UE 710 to a Node B 708.

The core network 704 can interface with one or more access networks, such as the UTRAN 702. As shown, the core network 704 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 704 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a visitor location register (VLR) that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The illustrated core network 704 also supports packet-switched data services with a serving GPRS support node (SGSN) 718 and a gateway GPRS support node (GGSN) 720. General Packet Radio Service (GPRS) is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 702 is based on such DS-CDMA technology and additionally calls for a frequency division duplexing (FDD). FDD uses a different carrier frequency for the uplink (UL) and downlink (DL) between a Node B 408 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 710 and the core network 704 (referring to FIG. 7), and may include circuit switched and packet switched protocols. The AS provides the lower layers, for signaling between the UTRAN 702 and the UE 710, and may include a user plane and a control plane. Here, the user plane or data plane carries user traffic, while the control plane carries control information (i.e., signaling).

Figure 8:
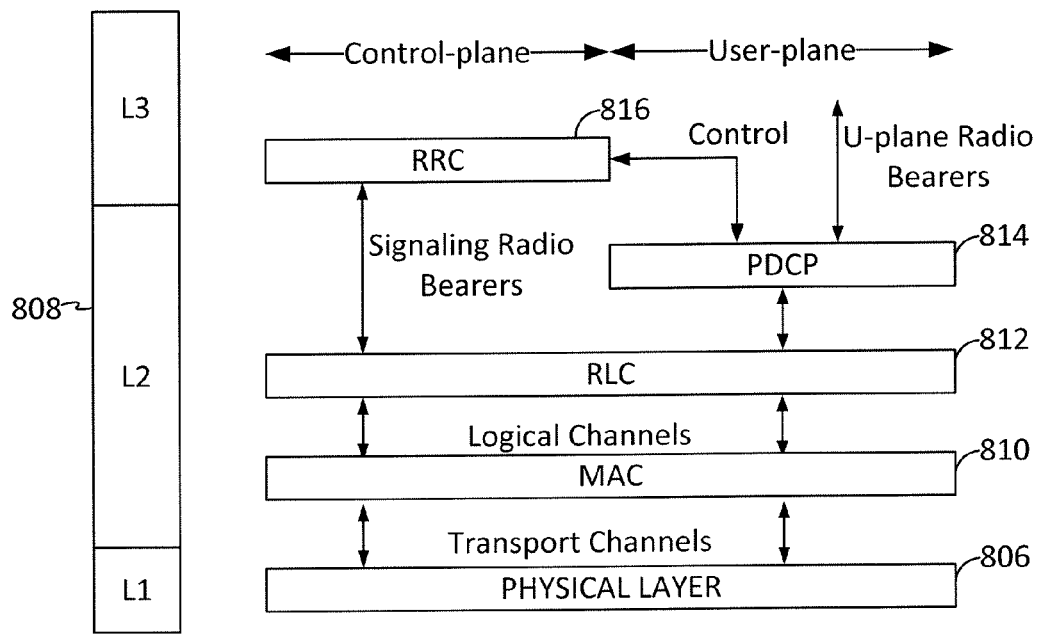
FIG. 8 is a diagram illustrating an example of a radio protocol architecture for user and control planes that may be included in devices executing the present aspects.

Turning to FIG. 8, the AS is shown with three layers: Layer 1, Layer 2, and Layer 3. Layer 1 is the lowest layer and implements various physical layer signal processing functions. Layer 1 will be referred to herein as the physical layer 806. The data link layer, called Layer 2 808, is above the physical layer 806 and is responsible for the link between a UE and a Node B, which may be UE 110 and base station 120 of FIG. 1 and/or UE 710 and Node B 708 of FIG. 7, over the physical layer 806.

At Layer 3, the RRC layer 816 handles the control plane signaling between the UE 710 and the Node B 708. RRC layer 816 includes a number of functional entities for routing higher layer messages, handling broadcasting and paging functions, establishing and configuring radio bearers, etc.

In the illustrated air interface, the L2 layer 808 is split into sublayers. In the control plane, the L2 layer 808 includes two sublayers: a medium access control (MAC) sublayer 810 and a radio link control (RLC) sublayer 812. In the user plane, the L2 layer 808 additionally includes a packet data convergence protocol (PDCP) sublayer 814. Although not shown, the UE may have several upper layers above the L2 layer 808 including a network layer (e.g., IP layer) that is terminated at a PDN gateway on the network side and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between Node Bs.

The RLC sublayer 812 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

The MAC sublayer 810 includes various MAC entities, including but not limited to a MAC-d entity and MAC-hs/ehs entity. The Radio Network Controller (RNC) houses protocol layers from MAC-d and above. For the high speed channels, the MAC-hs/ehs layer is housed in the Node B.

From the UE side, The MAC-d entity is configured to control access to all the dedicated transport channels, to a MAC-c/sh/m entity, and to the MAC-hs/ehs entity. Further, from the UE side, the MAC-hs/ehs entity is configured to handle the HSDPA specific functions and control access to the HS-DSCH transport channel. Upper layers configure which of the two entities, MAC-hs or MAC-ehs, is to be applied to handle HS-DSCH functionality.

Figure 9:
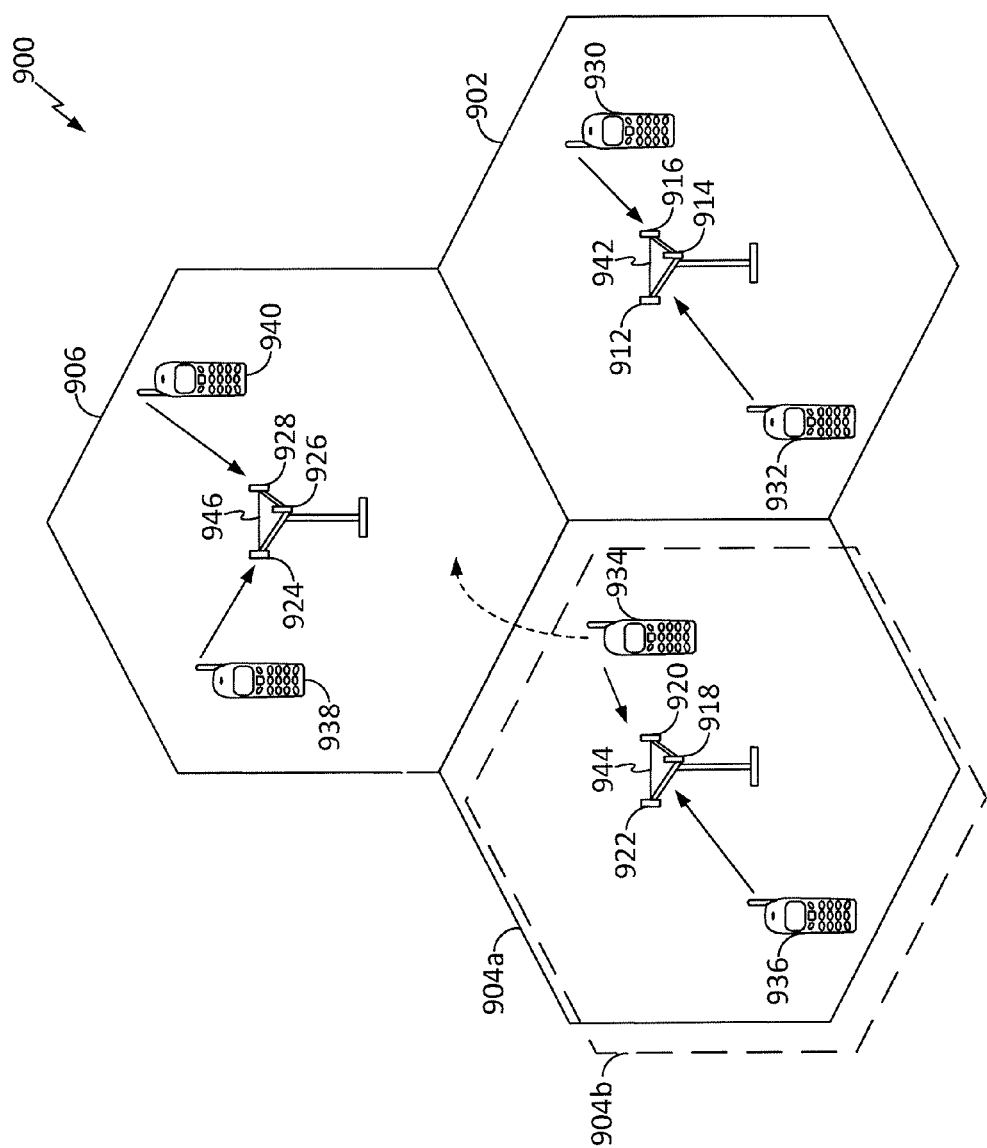
FIG. 9 is a diagram illustrating an example of an access network having aspects configured to prioritize non-scheduled data.

The UTRAN 702 is one example of a RAN that may be utilized in accordance with the present disclosure. Referring now to FIG. 9, by way of example and without limitation, a simplified schematic illustration of a RAN 900 in a UTRAN architecture is illustrated. The system includes multiple cellular regions (cells), including cells 902, 904, and 906, each of which may include one or more sectors. Cells may be defined geographically (e.g., by coverage area) and/or may be defined in accordance with a frequency, scrambling code, etc. That is, the illustrated geographically-defined cells 902, 904, and 906 may each be further divided into a plurality of cells, e.g., by utilizing different scrambling codes. For example, cell 904*a* may utilize a first scrambling code, and cell 904*b*, while in the same geographic region and served by the same Node B 944, may be distinguished by utilizing a second scrambling code.

In a cell that is divided into sectors, the multiple sectors within a cell can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 may each correspond to a different sector. In cell 906, antenna groups 924, 926, and 928 may each correspond to a different sector.

The cells 902, 904, and 906 may include several UEs that may be in communication with one or more sectors of each cell 902, 904, or 906. For example, UEs 930 and 932 may be in communication with Node B 942, UEs 934 and 936 may be in communication with Node B 944, and UEs 938 and 940 may be in communication with Node B 946. Here, each Node B 942, 944, and 946 may be configured to provide an access point to a core network 704 (see FIG. 7) for all the UEs 930, 932, 934, 936, 938, and 940 in the respective cells 902, 904, and 906. In an aspect, UEs 930, 932, 934, 936, 938, and 940 may be UE 110 of FIG. 1 and/or UE 710 of FIG. 7, and Node B 942, 944, and 946 may be base station 120 of FIG. 1 and/or Node B 708 of FIG. 7.

During a call with a source cell, or at any other time, the UE 936 may monitor various parameters of the source cell as well as various parameters of neighboring cells. Further, depending on the quality of these parameters, the UE 936 may maintain communication with one or more of the neighboring cells. During this time, the UE 936 may maintain an Active Set, that is, a list of cells to which the UE 936 is simultaneously connected (i.e., the UTRAN cells that are currently assigning a downlink dedicated physical channel DPCH or fractional downlink dedicated physical channel F-DPCH to the UE 936 may constitute the Active Set).

Figure 10:
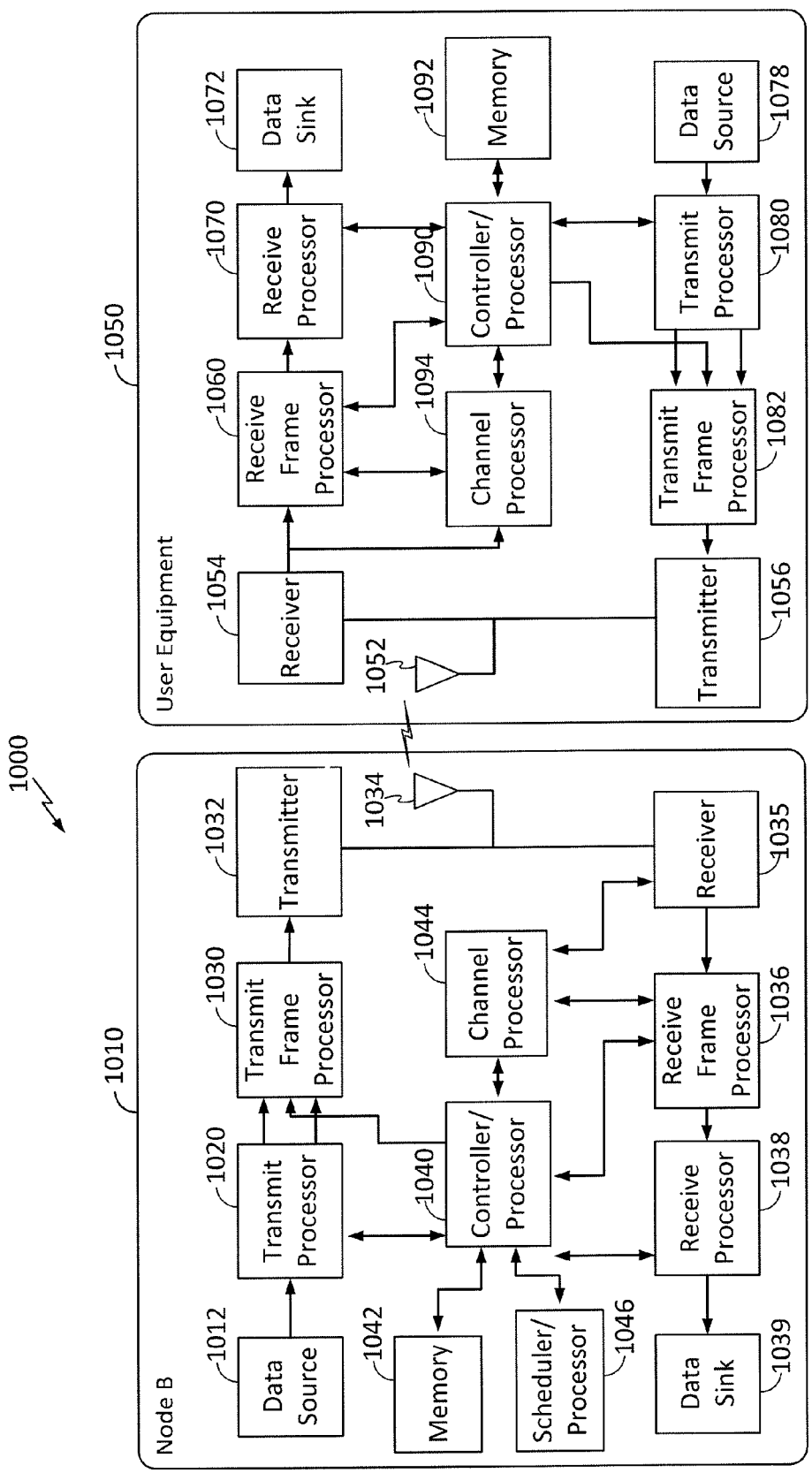
FIG. 10 is a diagram illustrating an example of a user equipment in communication with a base station in a telecommunications system having aspects configured to prioritize non-scheduled data.

FIG. 10 is a block diagram of an exemplary Node B 1010 in communication with an exemplary UE 1050, having aspects configured to prioritize non-scheduled data as described herein. In an aspect, the UE 1050 may be UE 110 of FIG. 1, UE 710 of FIG. 7 and/or one of UEs 930, 932, 934, 936, 938, and 940 of FIG. 9 and Node B 1010 may be base station 120 of FIG. 1, Node B 708 of FIG. 7, and/or one of Node Bs 942, 944, and 946 of FIG. 9.

In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of prioritizing non-scheduled data, comprising:
   identifying non-scheduled data to be transmitted on a non-scheduled MAC-d flow, wherein the non-scheduled MAC-d flow is associated with a non-scheduled priority;

identifying scheduled data to be transmitted on a scheduled MAC-d flow, wherein the scheduled MAC-d flow is associated with a scheduled priority;
receiving a pre-allocation of power associated with a non-empty non-scheduled MAC-d flow;
determining that a priority condition is that the non-scheduled priority is a highest priority as compared with at least the scheduled priority;
applying all of the pre-allocation of power to the non-scheduled MAC-d flow based on the determining, and
transmitting the non-scheduled MAC-d flow and the scheduled MAC-d flow according to the priority condition, wherein the transmitting comprises transmitting the non-scheduled MAC-d flow according to the pre-allocation of power.

2. A method of prioritizing non-scheduled data, comprising:
identifying non-scheduled data to be transmitted on a non-scheduled MAC-d flow, wherein the non-scheduled MAC-d flow is associated with a non-scheduled priority;
identifying scheduled data to be transmitted on a scheduled MAC-d flow, wherein the scheduled MAC-d flow is associated with a scheduled priority;
determining that a priority condition is that the non-scheduled priority is a lower priority than the scheduled priority;
adjusting at least one of the non-scheduled priority and the scheduled priority such that the non-scheduled priority comprises a boosted non-scheduled priority that is a higher priority than the scheduled priority; and
transmitting the non-scheduled MAC-d flow and the scheduled MAC-d flow according to a priority condition, wherein the transmitting comprises transmitting the non-scheduled MAC-d flow based on the boosted non-scheduled priority and transmitting the scheduled MAC-d flow based on the scheduled priority.

3. The method of claim 2, further comprising receiving a configuration for the non-scheduled MAC-d flow to be assigned to a first logical channel associated with the non-scheduled priority, and for the scheduled MAC-d flow to be assigned to a second logical channel associated with the scheduled priority.

4. The method of claim 2, further comprising:
determining that the non-scheduled MAC-d flow is carrying signaling radio bearer (SRB) data by
determining that at least one of data size, traffic frequency, and radio bearer ID for the non-scheduled data are indicative of signaling radio bearer data.

5. The method of claim 2, wherein the adjusting comprises boosting the non-scheduled priority to a higher priority than the scheduled priority.

6. The method of claim 2, wherein the adjusting comprises lowering the scheduled priority to be a lower priority than the non-scheduled priority.

7. A non-transitory computer-readable medium storing computer executable code for prioritizing non-scheduled data, comprising:
code for causing a computer to:
identify non-scheduled data to be transmitted on a non-scheduled MAC-d flow, wherein the non-scheduled MAC-d flow is associated with a non-scheduled priority;
identify scheduled data to be transmitted on a scheduled MAC-d flow, wherein the scheduled MAC-d flow is associated with a scheduled priority;
receive a pre-allocation of power associated with a non-empty non-scheduled MAC-d flow;
determine that a priority condition is that the non-scheduled priority is a highest priority as compared with at least the scheduled priority;
apply all of the pre-allocation of power to the non-scheduled MAC-d flow based on the determining, and
transmit the non-scheduled MAC-d flow and the scheduled MAC-d flow according to a priority condition, wherein the transmitting comprises transmitting of the non-scheduled MAC-d flow according to the pre-allocation of power.

8. An apparatus for prioritizing non-scheduled data, comprising:
means for identifying non-scheduled data to be transmitted on a non-scheduled MAC-d flow, wherein the non-scheduled MAC-d flow is associated with a non-scheduled priority;
means for identifying scheduled data to be transmitted on a scheduled MAC-d flow, wherein the scheduled MAC-d flow is associated with a scheduled priority;
means for receiving a pre-allocation of power associated with a non-empty non-scheduled MAC-d flow;
means for determining that the priority condition is that the non-scheduled priority is a highest priority as compared with at least the scheduled priority;
means for applying all of the pre-allocation of power to the non-scheduled MAC-d flow based on the determining; and
means for transmitting the non-scheduled MAC-d flow and the scheduled MAC-d flow according to the priority condition, wherein the transmitting comprises transmitting the non-scheduled MAC-d flow according to the pre-allocation of power.

9. An apparatus for prioritizing non-scheduled data; comprising:
a memory,
a processor communicatively coupled to the memory, wherein the processor and the memory are configured to:
identify non-scheduled data to be transmitted on a non-scheduled MAC-d flow, wherein the non-scheduled MAC-d flow is associated with a non-scheduled priority;
identify scheduled data to be transmitted on a scheduled MAC-d flow, wherein the scheduled MAC-d flow is associated with a scheduled priority;
receive a pre-allocation of power associated with a non-empty non-scheduled MAC-d flow;
determine that the priority condition is that the non-scheduled priority is a highest priority as compared with at least the scheduled priority; and
apply all of the pre-allocation of power to the non-scheduled MAC-d flow based on the determining; and
a MAC-d flow transmitter communicatively coupled to the processor and the memory, and configured to transmit the non-scheduled MAC-d flow and the scheduled MAC-d flow according to the priority condition, wherein the MAC-d flow transmitter is configured to transmit the non-scheduled MAC-d flow according to the pre-allocation of power.

10. An apparatus for prioritizing non-scheduled data, comprising:
a memory,
a processor communicatively coupled to the memory, wherein the processor is configured to:

identify non-scheduled data to be transmitted on a non-scheduled MAC-d flow, wherein the non-scheduled MAC-d flow is associated with a non-scheduled priority;

identify scheduled data to be transmitted on a scheduled MAC-d flow, wherein the scheduled MAC-d flow is associated with a scheduled priority;

determine that a priority condition is that the non-scheduled priority is a lower priority than the scheduled priority; and adjust at least one of the non-scheduled priority and the scheduled priority such that the non-scheduled priority comprises a boosted non-scheduled priority that is a higher priority than the scheduled priority; and a MAC-d flow transmitter communicatively coupled to the processor and the memory, and configured to transmit the non-scheduled MAC-d flow and the scheduled MAC-d flow according to the priority condition, wherein the MAC-d flow transmitter is configured to transmit the non-scheduled MAC-d flow based on the boosted non-scheduled priority and transmit the scheduled MAC-d flow based on the scheduled priority.

11. The apparatus of claim 10, wherein the processor is further configured to receive a configuration for the non-scheduled MAC-d flow to be assigned to a first logical channel associated with the non-scheduled priority, and for the scheduled MAC-d flow to be assigned to a second logical channel associated with the scheduled priority.

12. The apparatus of claim 10, wherein the processor is further configured to determine that the non-scheduled MAC-d flow is carrying signaling radio bearer (SRB) data by determining that at least one of data size, traffic frequency, and radio bearer ID for the non-scheduled data are indicative of signaling radio bearer data.

13. The apparatus of claim 10, wherein the processor is configured to boost the non-scheduled priority to a higher priority than the scheduled priority.

14. The apparatus of claim 10, wherein the processor is configured to lower the scheduled priority to be a lower priority than the non-scheduled priority.

15. A non-transitory computer-readable medium storing computer executable code for prioritizing non-scheduled data, comprising:

code for causing a computer to:

identify non-scheduled data to be transmitted on a non-scheduled MAC-d flow, wherein the non-scheduled MAC-d flow is associated with a non-scheduled priority;

identify scheduled data to be transmitted on a scheduled MAC-d flow, wherein the scheduled MAC-d flow is associated with a scheduled priority;

determine that a priority condition is that the non-scheduled priority is a lower priority than the scheduled priority;

adjust at least one of the non-scheduled priority and the scheduled priority such that the non-scheduled priority comprises a boosted non-scheduled priority that is a higher priority than the scheduled priority; and transmit the non-scheduled MAC-d flow according to the priority condition based on the boosted non-scheduled priority and transmit the scheduled MAC-d flow based on the scheduled priority.

16. An apparatus for prioritizing non-scheduled data, comprising:

means for identifying non-scheduled data to be transmitted on a non-scheduled MAC-d flow, wherein the non-scheduled MAC-d flow is associated with a non-scheduled priority;

means for identifying scheduled data to be transmitted on a scheduled MAC-d flow, wherein the scheduled MAC-d flow is associated with a scheduled priority;

means for determining that a priority condition is that the non-scheduled priority is a lower priority than the scheduled priority;

means for adjusting at least one of the non-scheduled priority and the scheduled priority such that the non-scheduled priority comprises a boosted non-scheduled priority that is a higher priority than the scheduled priority; and means for transmitting the non-scheduled MAC-d flow according to the priority condition based on the boosted non-scheduled priority and for transmitting the scheduled MAC-d flow based on the scheduled priority.

* * * * *